United States Patent [19]

Nurse, Jr.

[11] Patent Number: 5,582,716
[45] Date of Patent: Dec. 10, 1996

[54] FILTER FOR SEPTIC TANKS

[76] Inventor: Harry L. Nurse, Jr., 10409 Watterson Trail, Louisville, Ky. 40299

[21] Appl. No.: 437,286

[22] Filed: May 8, 1995

[51] Int. Cl.$^6$ ................................................. B01D 21/24
[52] U.S. Cl. .................. 210/121; 210/232; 210/237; 210/416.1; 210/521; 210/522; 210/532.2
[58] Field of Search .................................. 210/104, 121, 210/124, 232, 237, 416.1, 532.2, 521, 522, 488

[56] References Cited

U.S. PATENT DOCUMENTS

| | | |
|---|---|---|
| 2,900,084 | 8/1959 | Zohel . |
| 3,332,552 | 7/1967 | Zohel . |
| 4,439,323 | 3/1984 | Ball . |
| 4,710,295 | 12/1987 | Zohel . |
| 4,997,562 | 3/1991 | Warner .................................. 210/532.2 |
| 5,242,584 | 9/1993 | Hoarau .................................. 210/532.2 |
| 5,382,357 | 1/1995 | Nurse . |

*Primary Examiner*—Robert J. Popovics
*Attorney, Agent, or Firm*—Middleton & Reutlinger; Charles G. Lamb

[57] ABSTRACT

A filter unit for use in a septic tank system includes a housing having an upper section and a lower section wherein the upper section has a cross-sectional area greater than the lower section. The lower section receives a plurality of disc-dam units to form a filter unit therein wherein each disc-dam unit is provided with an outer periphery partitioned by an upwardly directed dam to define a fluid inlet on one side of the dam and a fluid outlet on the opposite side of the dam. The distance between an upper surface of the dam and a lower surface of a disc-dam unit forming slots of preselected height to provide defined slots for the flow of waste water thereacross from the inlet side to the outlet side of the disc-dam units. The lower section is also provided with a vertical chamber therein in flow communication with the fluid outlet of the disc-dam units and the upper section of the housing. A positive pressure pump is disposed within the upper section of the housing wherein an inlet in the pump is in flow communication with the upper section or disc-dam outlets and an outlet from the pump is in flow communication with a discharge conduit from the housing. The positive pressure pump is actuated in response to a level control device in the upper housing.

1 Claim, 3 Drawing Sheets

5,582,716

FILTER FOR SEPTIC TANKS

BACKGROUND OF THE INVENTION

The present invention relates to filter units for use with septic systems and more particularly to a filter unit disposed within a septic tank having a controlled outlet flow rate.

There are a number of filtration systems known in the prior art for use in a septic tank to remove the solid materials from the waste water prior to the waste water being discharged from the septic tank. One of the earlier references of which I am familiar is U.S. Pat. No. 2,900,084 which issued to Zabel. U.S. Pat. No. 2,900,084 teaches a septic tank having its interior arranged to provide a U-shaped path of flow wherein one leg of the U constitutes an upstream chamber which receives incoming sewage through a tank inlet at a high inlet level and is normally filled therewith up to an intermediate stagnant level spaced substantially below the high inlet level and the other leg of the U constitutes a downstream chamber which receives partially or completely digested sewage from the upstream chamber through the bight of the U and is normally filled therewith up to the intermediate stagnant level and which discharges a clarified effulent through a tank outlet when additional sewage pours into the upstream chamber and thus causes the downstream chamber to overflow at a stagnant level. Particularly, this reference teaches a cylindrical casing vertically arranged with the outlet end portion of the tank forming the downstream chamber with an inlet opening at its bottom and a sidewall outlet at the top side of the stagnant level. An outlet trap arranged within the casing to separate solids from the fluid material overflowing the downstream chamber and to provide an outlet passageway directing that overflow into a tank outlet is also provided.

More recently, U.S. Pat. No. 4,710,295, which also issued to Zabel, teaches a filter unit for use in a casing disposed in a septic tank which includes a plurality of vertically stacked disc-dam units forming a cartridge having a longitudinal axis on each disc-dam unit with a generally circular planar base and a chord edge. The chord edge of each disc-dam unit is in mutual alignment so that first and second sealing edges are formed through perspective ends of the chord edge with the first and second sealing edges being parallel to the longitudinal axis. Each disc-dam unit or base includes a continuous elongate dam located on one side of the base and extends outwardly therefrom to terminate at a dam top where the elongate dam has a dam first end adjacent to the first sealing edge and extends continuously to a dam second end at the second sealing edge to divide the base into an upstream and downstream side with a retaining device to hold the disc-dam units in stacked relation with selected spacing between the dam top of one disc-dam unit and the bottom surface of the next vertical-above unit.

SUMMARY OF THE INVENTION

An object of the present invention is to provide a filter unit for a sewage or septic tank for separating solid waste matter from waste water.

Another object of this invention is to provide a filter unit completely disposed within a septic tank having an open bottom for receiving the fluids containing particulates therein wherein the filtering medium is a stack of disc-dam plates or units through which the waste water has to pass before being discharged from the septic tank.

Even another object of this invention is to provide a filtering unit disposed within the waste water of a septic tank which includes a positive pressure pump disposed above a stack of disc-dam plate filtering units wherein the flow of waste water through the filtering unit is up through an open bottom of a filter housing and across the filter plates into a filter outlet which is in flow communication with the inlet to the positive pressure pump.

More particularly, the present invention provides a filter unit comprising:

a housing having a lower section and an upper section, the lower section having an opening in the bottom and a cross-sectional area less than said upper section;

a plurality of vertically stacked disc-dam units disposed within said lower section, each of the disc-dam units having an outer periphery partitioned by baffle means into a fluid inlet and a fluid outlet, the vertical distance between the disc-dam units being preselected to form slots of preselected heights between an upper surface of the baffle means and a lower surface of adjacent vertically-above disc-dam units, the lower section having a vertical chamber therein in flow communication with the fluid outlet of the disc-dam units and an interior in the upper section of said housing;

a positive pressure pump disposed in the upper section of the housing, the pump having an inlet in flow communication with the interior in the upper section and an outlet in flow communication with a discharge conduit from the housing; and, level control means in the upper housing, the level control means activating and deactivating the pump at preselected fluid levels in the upper section of the housing.

Further objects and advantages of this invention will appear to those skilled in the art from the following description and appended claims, reference being had to the accompanying drawings forming a part of the specification wherein like reference characters designate corresponding parts into several views.

DETAILED DESCRIPTION OF THE PREFERRED EMBODIMENT

Figure 1:
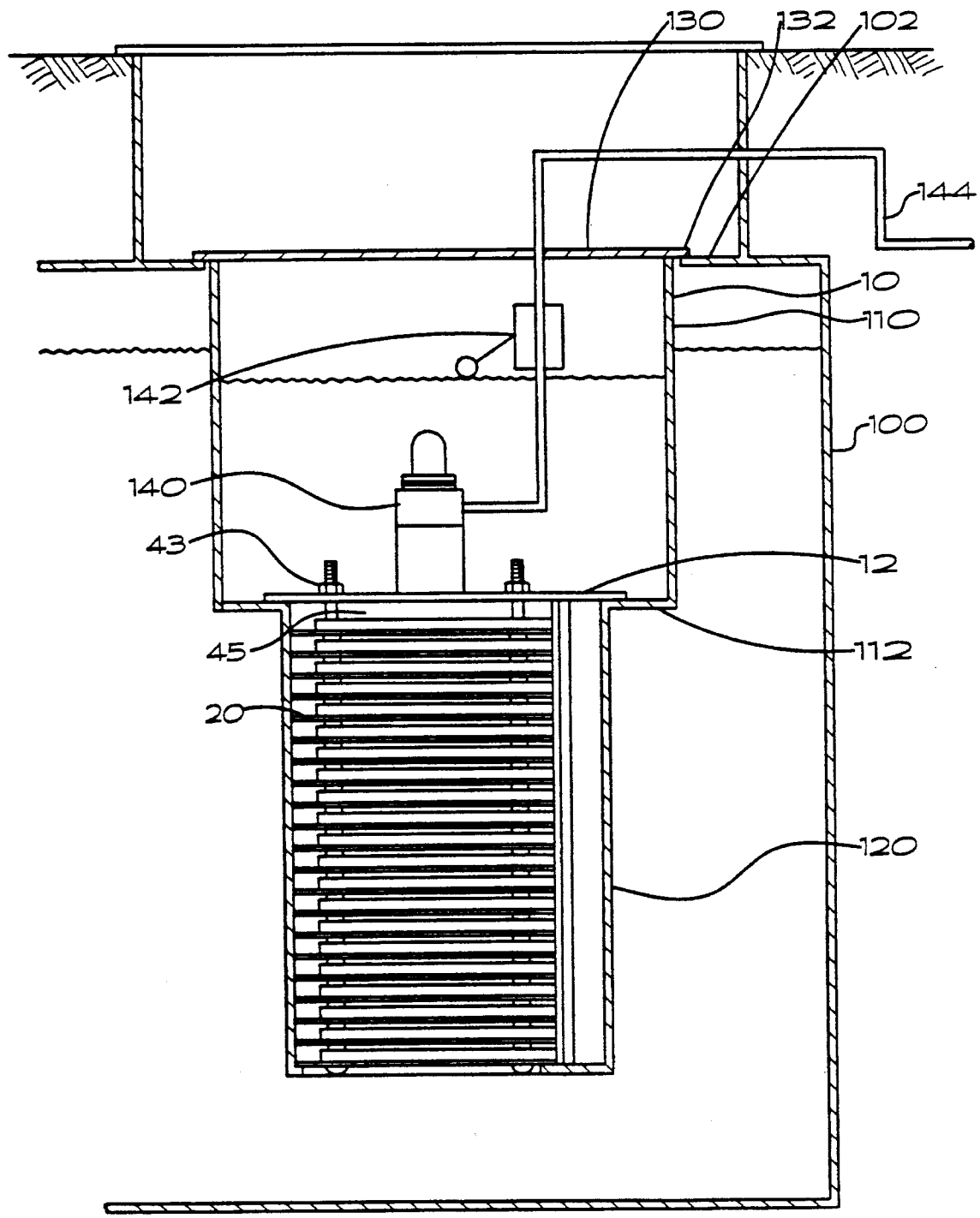
FIG. 1 is an elevational sectional view of one preferred embodiment of the present invention disposed within a septic tank.

In FIG. 1 is shown a filtering unit of the present invention as installed in a septic tank identified by the numeral 100. Disposed within the septic tank 100 is a housing 10 having an upper section 110 and a lower section 120. The housing 10 is of cylindrical configuration wherein the upper section 110 has a diameter and therefore a cross-sectional area substantially greater than the lower section 120 which is also of cylindrical configuration. The housing 10 is also provided with a closed top 130 which has an outwardly extending flange portion 132 which rests upon a lip 102 of the septic tank 100.

Disposed within the upper portion 110 of the housing 10 is a positive pressure pump 140 which is actuated in response to a level control device 142 which controls the fluid level within the housing 10 between a preselected lower level and a preselected upper level. The positive pressure pump 140 and level control device 142 are any well known in the art.

Figure 2:
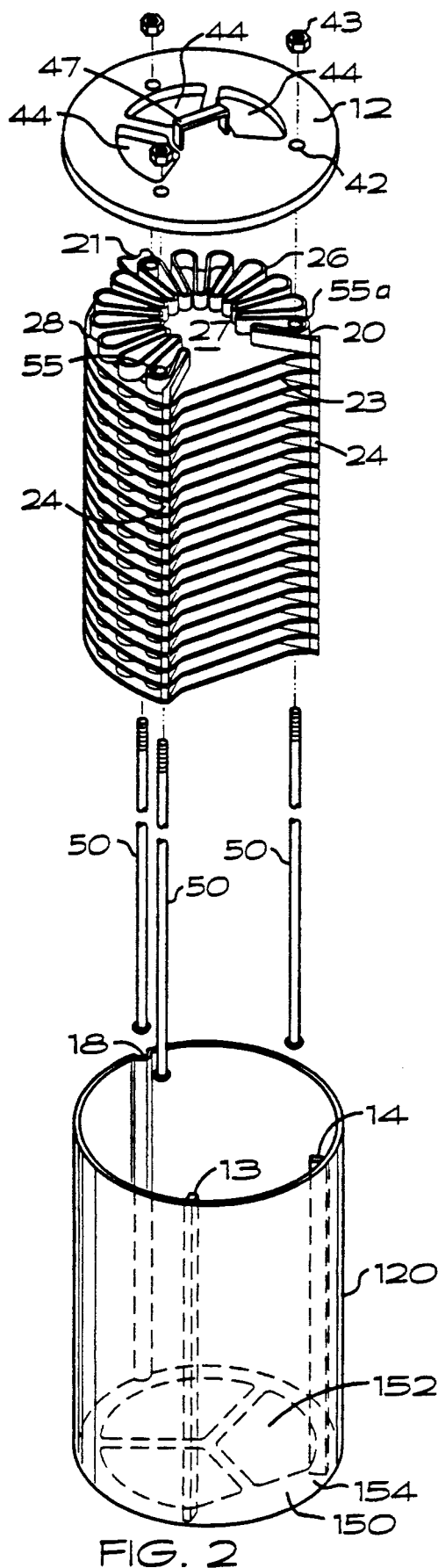
FIG. 2 is an exploded perspective view of the filter unit of the present invention as shown in the lower section of a filter housing.
Figure 3:
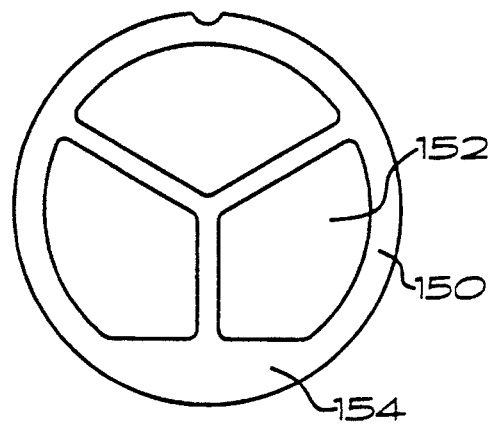
FIG. 3 is a bottom view of the housing of FIG. 2.

As best shown in FIG. 2, lower section 120 of the housing 10 includes a horizontally extending bottom portion 150 which includes openings 152, three being shown in FIG. 2 and FIG. 3, for the upflow of waste water therethrough. The bottom 150 is also provided with a solid portion 154 in one arcuate segment thereof with longitudinally extending seal members 13 and 14 at opposite ends of the arcuate segment being provided to extend generally the vertical length of the lower portion or section 120 for engaging with disc-dam filter discs 20 as described hereinafter.

Figure 4:
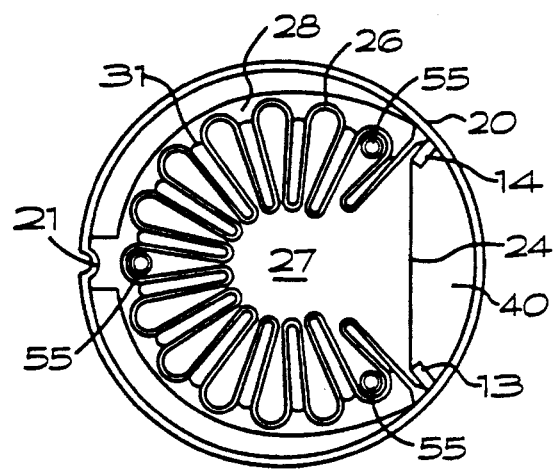
FIG. 4 is a top view of one disc-dam unit shown in FIG. 2.

A lobe 18 is provided along one longitudinal edge of lower section 120 to receive notches 21 in the filter discs 20 to align the discs 20 within the lower section 120. The filter discs 20 are generally of circular cross-section with a chord section 23 cut, as shown, where lips 24 are provided, also as shown, to engage seal members 13 and 14 when a stack of filter units are positioned within the lower section 120. As described hereinafter and as described more particularly in U.S. Pat. No. 4,710,295 and U.S. Pat. No. 3,332,552 each of the discs 20 constitutes a disc-dam unit which can be made of a suitable material, for example, a plastic, such as polyethylene or polypropylene or polyvinyl chloride. Each unit comprises an elongate sinuous overflow dam or strip 26 which extends from one of the edges or lips 24 to the opposite or other edge or lip 24 in a serpentine path on top of the discs 20. The strip 26 extends vertically upward to form a dam on each disc 20 and the portion identified by the numeral 27 on one side of the dam unit forms an outlet or downstream side of the discs 20 and the portion 28 on the opposite side of the dam unit 20 forms an inlet or upstream side for each of the discs 20. As shown in FIG. 4, slots 31 are provided between the turns of the sinuous strip 26 to permit the return of oversized solids through the inlet opening 152 in the lower section 120 as described hereinafter.

Figure 5:
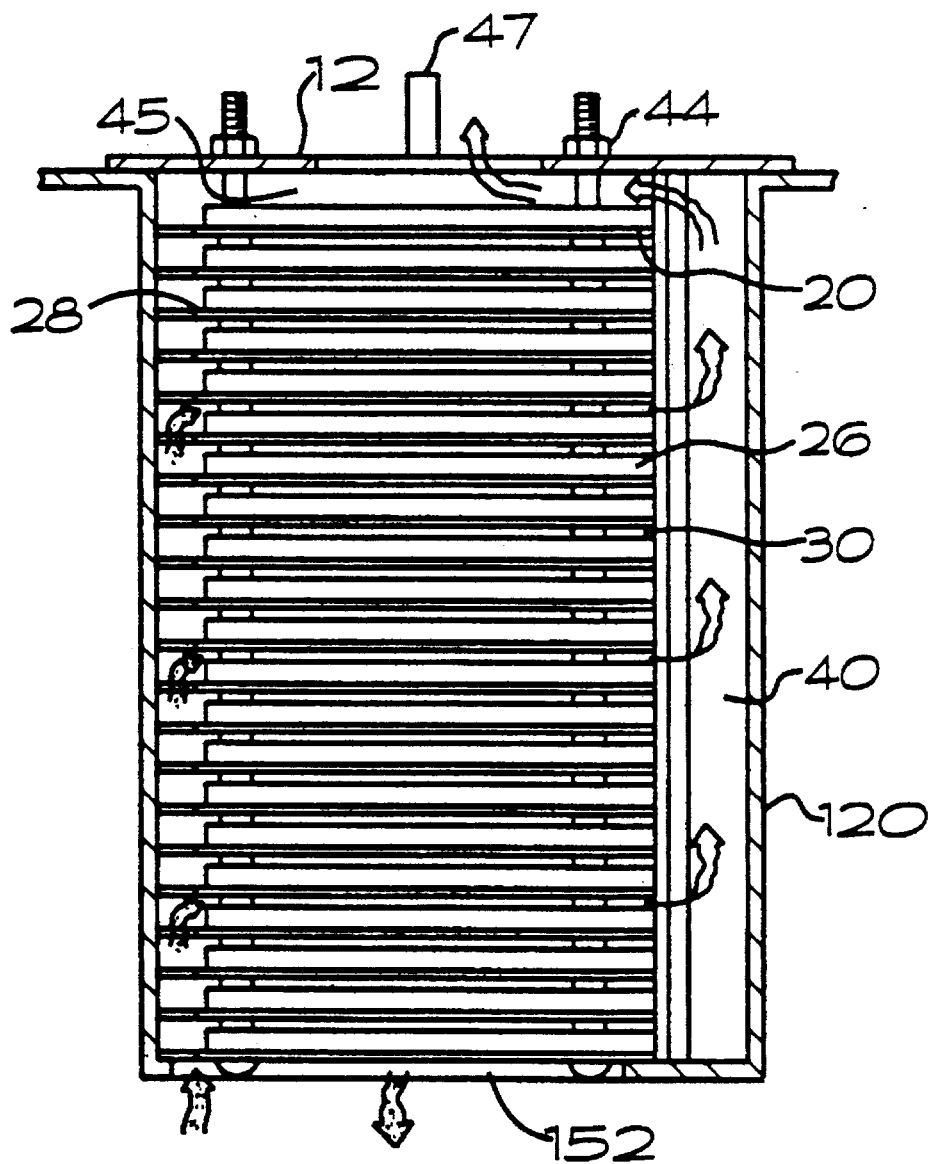
FIG. 5 is a side elevational view, in section, of the arrangement shown in FIG. 2, in assembled form.

As shown in FIG. 5 where the flow is shown over a dam member 26 into the outlet chamber 27, a slot 30 is defined between the spacing of the top surface of the dam 26 and a bottom surface on adjacent discs 20. This slot 30 defines the maximum particle size of solids that will be allowed to pass from the inlet 28 to the outlet 27. Also as shown in FIG. 4, a first outlet chamber 40 is defined between the seal members 13 and 14 and the outer edge or lip 24 of the discs 20.

Referring again to FIG. 2, it will be seen that the entire filter cartridge can be assembled on bolts 50 which extend longitudinally through holes 55 provided within each disc 20. An outlet discharge plate 12 is provided having apertures 42 to receive the rods 50 while nuts 43 can be provided to secure the outlet discharge plate 12 and the discs 20 within the lower section 120.

As shown in FIG. 1, the outlet discharge plate 12 is of a larger circumference than the disc 20 and extends beyond the outer circumferential walls of the lower section 120 thereby resting upon the outwardly extending flange member 112 of the upper section 110 of housing 10. As shown in FIG. 2, the outlet discharge plate 12 is provided with a plurality of openings 44, three being shown, for providing the means for fluid communication with the first outlet chamber 40. A second outlet chamber 45 is also provided between the upper most discs 20 and the outlet discharge plate 12, chamber 40 being in flow communication with chamber 45.

It will be understood that when the filter unit, as shown in FIGS. 1, 2 and 5, is completely assembled with the rods 50 extending through the length of stacked filter members and the outlet discharge plate or lid 12 is attached thereto, the entire unit excepting the discharge plate 12 is located within the lower section 120 of the housing 10, as shown in FIG. 1. A handle 47 is also provided on the outlet discharge plate 12 so as to provide easy removal of the entire filter unit from the housing 10 which can then be permanently implanted into a septic system.

In operation, the housing 10 is submerged within a septic tank so that the liquid will normally rise up through the openings 152 in the bottom 150 of the lower section 120 of the housing 10 and through the filter unit and into the upper section 10. The solids or particulate matter is removed from the waste water by flowing into the outlet of each discs 28 and by being unable to flow cross the dams 26 the particulates fall through the slots 31 directly downward into the septic tank for further digestion.

The size of the particulate matter to be removed and the size to be allowed to pass over the dams 26 is determined by the spacing 30 between the bottom of a disc 20 and the top of a dam 26. The spacing is determined by the height of the bolt guide post 55a which surround the bolt openings 55.

It is realized that various changes may be made by those skilled in the art without departing from the principals and spirit of the invention as expressed in the claims appended hereto.

What is claimed is:

1. A filter unit comprising:

a housing having a lower section and an upper section, said lower section having an opening in the bottom and a cross-sectional area less than said upper section;

a plurality of stacked disc-dam units disposed within said lower section, each of said disc-dam units having an outer periphery partitioned by upwardly directed baffle means into a fluid inlet and a fluid outlet, the distance between the disc-dam units being preselected to form slots of preselected heights between an upper surface of the baffle means and a lower surface of adjacent vertically-above disc-dam units, said lower section having a vertical chamber therein in flow communication with said fluid outlet of said disc-dam units and said upper section of said housing;

an outlet discharge plate having openings therein in spaced relation vertically above said disc-dam units and having a larger cross-sectional area than an inner cross-sectional area of a lower section of the housing, said outlet discharge plate resting upon a lower surface of said upper section;

a positive pressure pump disposed in said upper section of said housing, said pump having an inlet in flow communication with an interior of the upper section and an outlet in flow communication with a discharge conduit from said housing; and, a level control means in said upper housing, said level control means activating and deactivating said pump at preselected fluid levels.

\* \* \* \* \*